(12) United States Patent
Nardini et al.

(10) Patent No.: US 7,562,170 B2
(45) Date of Patent: *Jul. 14, 2009

(54) PROGRAMMABLE EXTENDED COMPRESSION MASK FOR DYNAMIC TRACE

(75) Inventors: Lewis Nardini, Dallas, TX (US); Manisha Agarwala, Richardson, TX (US); John M. Johnsen, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 94 days.

This patent is subject to a terminal disclaimer.

(21) Appl. No.: 11/566,762

(22) Filed: Dec. 5, 2006

(65) Prior Publication Data

US 2007/0094644 A1 Apr. 26, 2007

Related U.S. Application Data

(62) Division of application No. 10/302,189, filed on Nov. 22, 2002, now Pat. No. 7,162,552.

(51) Int. Cl.
*G06F 3/00* (2006.01)
*G06F 13/12* (2006.01)
*G06F 9/455* (2006.01)
*G06R 31/28* (2006.01)

(52) U.S. Cl. .............................. 710/68; 710/15; 703/23; 714/724

(58) Field of Classification Search ....................... None
See application file for complete search history.

(56) References Cited

U.S. PATENT DOCUMENTS

| 4,087,794 A | 5/1978 | Beausoleil et al. |
| 4,325,120 A | 4/1982 | Colley et al. |
| 5,140,687 A | 8/1992 | Dye et al. |
| 5,848,264 A | 12/1998 | Baird et al. |
| 2001/0025237 A1 | 9/2001 | Cofler et al. |

*Primary Examiner*—Alan Chen
(74) *Attorney, Agent, or Firm*—Robert D. Marshall, Jr.; W. James Brady; Frederick J. Telecky, Jr.

(57) ABSTRACT

This invention provides trace address compression by comparing respective bytes of a current trace address with a stored comparison address. Only the least significant bytes of the current trace address that do not match the comparison address or are less significant than any section of the current trace address that does not match the comparison address are transmitted. This sometimes reduces the amount of data that needs to be transmitted. The comparison address is specified by a central processing unit via a memory mapped register write operation.

12 Claims, 3 Drawing Sheets

PROGRAMMABLE EXTENDED COMPRESSION MASK FOR DYNAMIC TRACE

This application is a divisional application of U.S. patent application Ser. No. 10/302,189 filed Nov. 22, 2002 now U.S. Pat. No. 7,162,552.

TECHNICAL FIELD OF THE INVENTION

The technical field of this invention is emulation hardware particularly for highly integrated digital signal processing systems.

BACKGROUND OF THE INVENTION

Advanced wafer lithography and surface-mount packaging technology are integrating increasingly complex functions at both the silicon and printed circuit board level of electronic design. Diminished physical access to circuits for test and emulation is an unfortunate consequence of denser designs and shrinking interconnect pitch. Designed-in testability is needed so the finished product is both controllable and observable during test and debug. Any manufacturing defect is preferably detectable during final test before a product is shipped. This basic necessity is difficult to achieve for complex designs without taking testability into account in the logic design phase so automatic test equipment can test the product.

In addition to testing for functionality and for manufacturing defects, application software development requires a similar level of simulation, observability and controllability in the system or sub-system design phase. The emulation phase of design should ensure that a system of one or more ICs (integrated circuits) functions correctly in the end equipment or application when linked with the system software. With the increasing use of ICs in the automotive industry, telecommunications, defense systems, and life support systems, thorough testing and extensive real-time debug becomes a critical need.

Functional testing, where the designer generates test vectors to ensure conformance to specification, still remains a widely used test methodology. For very large systems this method proves inadequate in providing a high level of detectable fault coverage. Automatically generated test patterns are desirable for full testability, and controllability and observability. These are key goals that span the full hierarchy of test from the system level to the transistor level.

Another problem in large designs is the long time and substantial expense involved in design for test. It would be desirable to have testability circuitry, system and methods that are consistent with a concept of design-for-reusability. In this way, subsequent devices and systems can have a low marginal design cost for testability, simulation and emulation by reusing the testability, simulation and emulation circuitry, systems and methods that are implemented in an initial device. Without a proactive testability, simulation and emulation plan, a large amount of subsequent design time would be expended on test pattern creation and upgrading.

Even if a significant investment were made to design a module to be reusable and to fully create and grade its test patterns, subsequent use of a module may bury it in application specific logic. This would make its access difficult or impossible. Consequently, it is desirable to avoid this pitfall.

The advances of IC design are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment and tighter tolerances.

Emulation technology utilizing scan based emulation and multiprocessing debug was introduced more than 10 years ago. In 1988, the change from conventional in circuit emulation to scan based emulation was motivated by design cycle time pressures and newly available space for on-chip emulation. Design cycle time pressure was created by three factors. Higher integration levels, such as increased use of on-chip memory, demand more design time. Increasing clock rates mean that emulation support logic causes increased electrical intrusiveness. More sophisticated packaging causes emulator connectivity issues. Today these same factors, with new twists, are challenging the ability of a scan based emulator to deliver the system debug facilities needed by today's complex, higher clock rate, highly integrated designs. The resulting systems are smaller, faster, and cheaper. They have higher performance and footprints that are increasingly dense. Each of these positive system trends adversely affects the observation of system activity, the key enabler for rapid system development. The effect is called "vanishing visibility."

FIG. 1 illustrates the trend in visibility and control over time and greater system integration. Application developers prefer the optimum visibility level illustrated in FIG. 1. This optimum visibility level provides visibility and control of all relevant system activity. The steady progression of integration levels and increases in clock rates steadily decrease the actual visibility and control available over time. These forces create a visibility and control gap, the difference between the optimum visibility and control level and the actual level available. Over time, this gap will widen. Application development tool vendors are striving to minimize the gap growth rate. Development tools software and associated hardware components must do more with less resources and in different ways. Tackling this ease of use challenge is amplified by these forces.

With today's highly integrated System-On-a-Chip (SOC) technology, the visibility and control gap has widened dramatically over time. Traditional debug options such as logic analyzers and partitioned prototype systems are unable to keep pace with the integration levels and ever increasing clock rates of today's systems. As integration levels increase, system buses connecting numerous subsystem components move on chip, denying traditional logic analyzers access to these buses. With limited or no significant bus visibility, tools like logic analyzers cannot be used to view system activity or provide the trigger mechanisms needed to control the system under development. A loss of control accompanies this loss in visibility, as it is difficult to control things that are not accessible.

To combat this trend, system designers have worked to keep these buses exposed. Thus the system components were built in a way that enabled the construction of prototyping systems with exposed buses. This approach is also under siege from the ever-increasing march of system clock rates. As the central processing unit (CPU) clock rates increase, chip to chip interface speeds are not keeping pace. Developers find that a partitioned system's performance does not keep pace with its integrated counterpart, due to interface wait states added to compensate for lagging chip to chip communication rates. At some point, this performance degradation reaches intolerable levels and the partitioned prototype system is no longer a viable debug option. In the current era production devices must serve as the platform for application development.

Increasing CPU clock rates are also limiting availability of other simple visibility mechanisms. Since the CPU clock rates can exceed the maximum I/O state rates, visibility ports exporting information in native form can no longer keep up with the CPU. On-chip subsystems are also operated at clock rates that are slower than the CPU clock rate. This approach may be used to simplify system design and reduce power consumption. These developments mean simple visibility ports can no longer be counted on to deliver a clear view of CPU activity. As visibility and control diminish, the development tools used to develop the application become less productive. The tools also appear harder to use due to the increasing tool complexity required to maintain visibility and control. The visibility, control, and ease of use issues created by systems-on-a-chip tend to lengthen product development cycles.

Even as the integration trends present developers with a tough debug environment, they also present hope that new approaches to debug problems will emerge. The increased densities and clock rates that create development cycle time pressures also create opportunities to solve them. On-chip, debug facilities are more affordable than ever before. As high speed, high performance chips are increasingly dominated by very large memory structures, the system cost associated with the random logic accompanying the CPU and memory subsystems is dropping as a percentage of total system cost. The incremental cost of several thousand gates is at an all time low. Circuits of this size may in some cases be tucked into a corner of today's chip designs. The incremental cost per pin in today's high density packages has also dropped. This makes it easy to allocate more pins for debug. The combination of affordable gates and pins enables the deployment of new, on-chip emulation facilities needed to address the challenges created by systems-on-a-chip.

When production devices also serve as the application debug platform, they must provide sufficient debug capabilities to support time to market objectives. Since the debugging requirements vary with different applications, it is highly desirable to be able to adjust the on-chip debug facilities to balance time to market and cost needs. Since these on-chip capabilities affect the chip's recurring cost, the scalability of any solution is of primary importance. "Pay only for what you need" should be the guiding principle for on-chip tools deployment. In this new paradigm, the system architect may also specify the on-chip debug facilities along with the remainder of functionality, balancing chip cost constraints and the debug needs of the product development team.

FIG. 2 illustrates an emulator system 100 including four emulator components. These four components are: a debugger application program 110; a host computer 120; an emulation controller 130; and on-chip debug facilities 140. FIG. 2 illustrates the connections of these components. Host computer 120 is connected to an emulation controller 130 external to host 120. Emulation controller 130 is also connected to target system 140. The user preferably controls the target application on target system 140 through debugger application program 110.

Host computer 120 is generally a personal computer. Host computer 120 provides access the debug capabilities through emulator controller 130. Debugger application program 110 presents the debug capabilities in a user-friendly form via host computer 120. The debug resources are allocated by debug application program 110 on an as needed basis, relieving the user of this burden. Source level debug utilizes the debug resources, hiding their complexity from the user. Debugger application program 110 together with the on-chip trace and triggering facilities provide a means to select, record, and display chip activity of interest. Trace displays are automatically correlated to the source code that generated the trace log. The emulator provides both the debug control and trace recording function.

The debug facilities are preferably programmed using standard emulator debug accesses through a JTAG or similar serial debug interface. Since pins are at a premium, the preferred embodiment of the invention provides for the sharing of the debug pin pool by trace, trigger, and other debug functions with a small increment in silicon cost. Fixed pin formats may also be supported. When the pin sharing option is deployed, the debug pin utilization is determined at the beginning of each debug session before target system 140 is directed to run the application program. This maximizes the trace export bandwidth. Trace bandwidth is maximized by allocating the maximum number of pins to trace.

The debug capability and building blocks within a system may vary. Debugger application program 100 therefore establishes the configuration at runtime. This approach requires the hardware blocks to meet a set of constraints dealing with configuration and register organization. Other components provide a hardware search capability designed to locate the blocks and other peripherals in the system memory map. Debugger application program 110 uses a search facility to locate the resources. The address where the modules are located and a type ID uniquely identifies each block found. Once the IDs are found, a design database may be used to ascertain the exact configuration and all system inputs and outputs.

Host computer 120 generally includes at least 64 Mbytes of memory and is capable of running Windows 95, SR-2, Windows NT, or later versions of Windows. Host computer 120 must support one of the communications interfaces required by the emulator. These may include: Ethernet 10T and 100T, TCP/IP protocol; Universal Serial Bus (USB); Firewire IEEE 1394; and parallel port such as SPP, EPP and ECP.

Host computer 120 plays a major role in determining the real-time data exchange bandwidth. First, the host to emulator communication plays a major role in defining the maximum sustained real-time data exchange bandwidth because emulator controller 130 must empty its receive real-time data exchange buffers as fast as they are filled. Secondly, host computer 120 originating or receiving the real-time data exchange data must have sufficient processing capacity or disc bandwidth to sustain the preparation and transmission or processing and storing of the received real-time data exchange data. A state of the art personal computer with a Firewire communication channel (IEEE 1394) is preferred to obtain the highest real-time data exchange bandwidth. This bandwidth can be as much as ten times greater performance than other communication options.

Emulation controller 130 provides a bridge between host computer 120 and target system 140. Emulation controller 130 handles all debug information passed between debugger application program 110 running on host computer 120 and a target application executing on target system 140. A presently preferred minimum emulator configuration supports all of the following capabilities: real-time emulation; real-time data exchange; trace; and advanced analysis.

Emulation controller 130 preferably accesses real-time emulation capabilities such as execution control, memory, and register access via a 3, 4, or 5 bit scan based interface. Real-time data exchange capabilities can be accessed by scan or by using three higher bandwidth real-time data exchange formats that use direct target to emulator connections other than scan. The input and output triggers allow other system components to signal the chip with debug events and vice-versa. Bit I/O allows the emulator to stimulate or monitor system inputs and outputs. Bit I/O can be used to support factory test and other low bandwidth, non-time-critical emulator/target operations. Extended operating modes are used to specify device test and emulation operating modes. Emulator controller 130 is partitioned into communication and emulation sections. The communication section supports host communication links while the emulation section interfaces to the target, managing target debug functions and the device debug port. Emulation controller 130 communicates with host computer 120 using one of industry standard communication links outlined earlier herein. The host to emulator connection is established with off the shelf cabling technology. Host to emulator separation is governed by the standards applied to the interface used.

Emulation controller 130 communicates with the target system 140 through a target cable or cables. Debug, trace, triggers, and real-time data exchange capabilities share the target cable, and in some cases, the same device pins. More than one target cable may be required when the target system 140 deploys a trace width that cannot be accommodated in a single cable. All trace, real-time data exchange, and debug communication occurs over this link. Emulator controller 130 preferably allows for a target to emulator separation of at least two feet. This emulation technology is capable of test clock rates up to 50 MHZ and trace clock rates from 200 to 300 MHZ, or higher. Even though the emulator design uses techniques that should relax target system 140 constraints, signaling between emulator controller 130 and target system 140 at these rates requires design diligence. This emulation technology may impose restrictions on the placement of chip debug pins, board layout, and requires precise pin timings. On-chip pin macros are provided to assist in meeting timing constraints.

The on-chip debug facilities offer the developer a rich set of development capability in a two tiered, scalable approach. The first tier delivers functionality utilizing the real-time emulation capability built into a CPU's mega-modules. This real-time emulation capability has fixed functionality and is permanently part of the CPU while the high performance real-time data exchange, advanced analysis, and trace functions are added outside of the core in most cases. The capabilities are individually selected for addition to a chip. The addition of emulation peripherals to the system design creates the second tier functionality. A cost-effective library of emulation peripherals contains the building blocks to create systems and permits the construction of advanced analysis, high performance real-time data exchange, and trace capabilities. In the preferred embodiment five standard debug configurations are offered, although custom configurations are also supported. The specific configurations are covered later herein.

SUMMARY OF THE INVENTION

Trace streams collect native program counter or data reference addresses as part of a synchronization marker or when encoding register branches or exception discontinuities. Particular system configurations may map code to different physical locations; but locality of the code or data within certain system/application configurations then tend to be fairly static.

Dynamic trace stream=s bandwidth is limited by pin allocation and significantly by the presence of register branches, exceptions and synchronization markers (which all use native program counter tags). Dynamic trace streams which collect data addresses as part of data logging or address locality profiling require frequent exporting of these addresses, without adversely intruding into system performance. This invention enables data compression of exported program counter or data reference addresses by a byte wise comparison with a central processing unit specified comparison address. Only differing bytes are included in the trace stream.

BRIEF DESCRIPTION OF THE DRAWINGS

These and other aspects of this invention are illustrated in the drawings, in which.

DETAILED DESCRIPTION OF PREFERRED EMBODIMENTS

The problem solved by this invention is dealing with tracing address references. Microprocessors and digital signal processors typically have architectures which run at high clock rates and generate large amounts of trace information. Processing such trace information by trace acquisition and encoding hardware without adversely affecting the accuracy of profiling is difficult. Due to the high demand for bandwidth on external dedicated trace export pins at the chip boundary, trace hardware may be forced to stall the central processing unit in order to guarantee collection of all trace information. This makes profiling of central processing unit performance using the same trace hardware intrusive and hence very inaccurate.

A flexible compression scheme is needed to deal with the collection of these reference addresses. This invention provides a progressive compression scheme for base addresses used by the application together with a way of exporting only an offset from this address. This scheme utilizes temporal and spatial locality of reference addresses to reduce the amount of data exported via the pins in situations where ranges of addresses fall within a common base address.

This invention is a progressive extended compression mask for dynamic trace. This invention reduces the bandwidth requirement when dealing with encoding register branches, data address references, exceptions or exporting synchronization markers. An example implementation of such a mask, to deal with a program counter or data address of 32 bits, includes a 24-bit register which is holds the last valid program counter address. The 24-bit mask is used to compare the upper range of the native program counter or data address as it emerges from the output of the pipeline flattener within the trace acquisition hardware. The mask is compared byte by byte and decisions are made as to how much of the reference address needs to be exported on to the trace stream.

Figure 3:
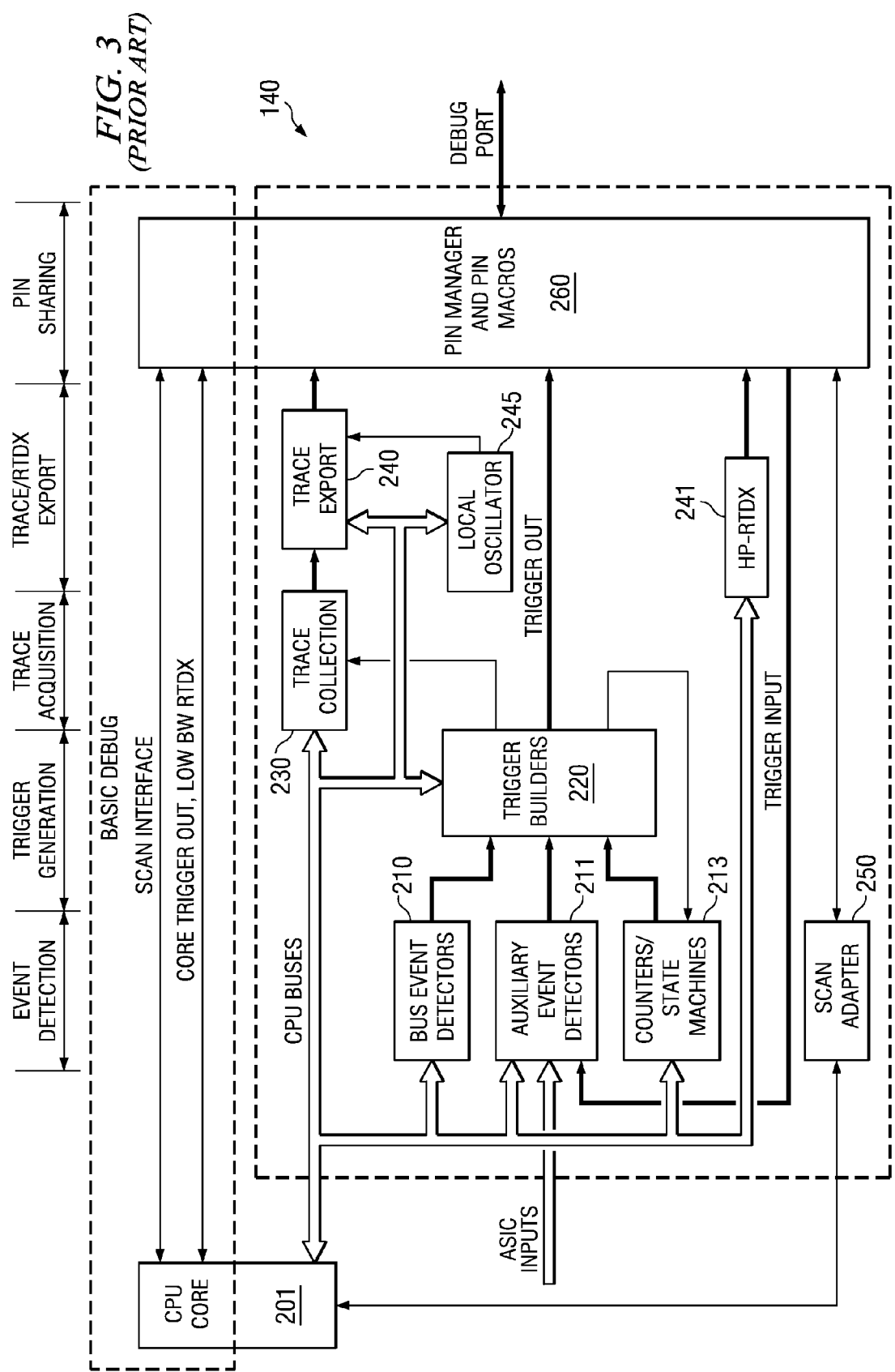
FIG. 3 illustrates in block diagram form a typical integrated circuit employing configurable emulation capability.

FIG. 3 illustrates an example of one on-chip debug architecture embodying target system 140. The architecture uses several module classes to create the debug function. One of these classes is event detectors including bus event detectors 210, auxiliary event detectors 211 and counters/state machines 213. A second class of modules is trigger generators including trigger builders 220. A third class of modules is data acquisition including trace collection 230 and formatting. A fourth class of modules is data export including trace export 240, and real-time data exchange export 241. Trace export 240 is controlled by clock signals from local oscillator 245. Local oscillator 245 will be described in detail below. A final class of modules is scan adaptor 250, which interfaces scan input/output to CPU core 201. Final data formatting and pin selection occurs in pin manager and pin micros 260.

The size of the debug function and its associated capabilities for any particular embodiment of a system-on-chip may be adjusted by either deleting complete functions or limiting the number of event detectors and trigger builders deployed. Additionally, the trace function can be incrementally increased from program counter trace only to program counter and data trace along with ASIC and CPU generated data. The real-time data exchange function may also be optionally deployed. The ability to customize on-chip tools changes the application development paradigm. Historically, all chip designs with a given CPU core were limited to a fixed set of debug capability. Now, an optimized debug capability is available for each chip design. This paradigm change gives system architects the tools needed to manage product development risk at an affordable cost. Note that the same CPU core may be used with differing peripherals with differing pin outs to embody differing system-on-chip products. These differing embodiments may require differing debug and emulation resources. The modularity of this invention permits each such embodiment to include only the necessary debug and emulation resources for the particular system-on-chip application.

The real-time emulation debug infrastructure component is used to tackle basic debug and instrumentation operations related to application development. It contains all execution control and register visibility capabilities and a minimal set of real-time data exchange and analysis such as breakpoint and watchpoint capabilities. These debug operations use on-chip hardware facilities to control the execution of the application and gain access to registers and memory. Some of the debug operations which may be supported by real-time emulation are: setting a software breakpoint and observing the machine state at that point; single step code advance to observe exact instruction by instruction decision making; detecting a spurious write to a known memory location; and viewing and changing memory and peripheral registers.

Real-time emulation facilities are incorporated into a CPU mega-module and are woven into the fabric of CPU core 201. This assures designs using CPU core 201 have sufficient debug facilities to support debugger application program 110 baseline debug, instrumentation, and data transfer capabilities. Each CPU core 201 incorporates a baseline set of emulation capabilities. These capabilities include but are not limited to: execution control such as run, single instruction step, halt and free run; displaying and modifying registers and memory; breakpoints including software and minimal hardware program breakpoints; and watchpoints including minimal hardware data breakpoints.

This invention concerns data compression for data and program counter addresses. In the preferred embodiment this invention is incorporated into trace collection 230. This invention compares the current address with a prior address and transmits only differing address bytes.

Figure 1:
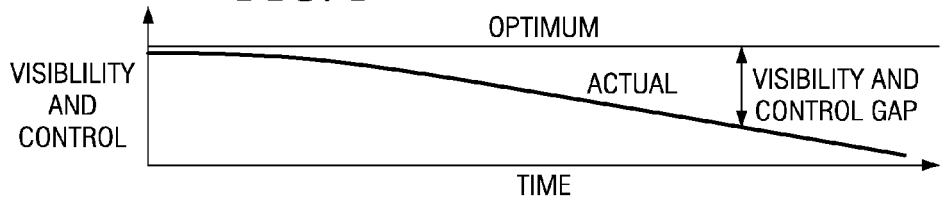
FIG. 1 illustrates the visibility and control of typical integrated circuits as a function of time due to increasing system integration.
Figure 2:
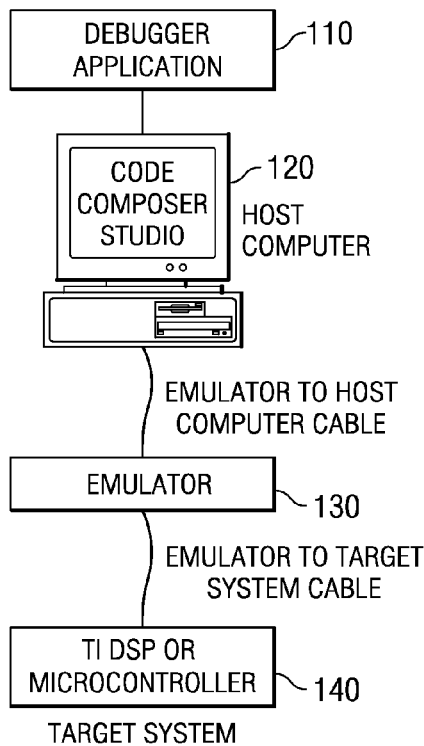
FIG. 2 illustrates an emulation system to which this invention is applicable.
Figure 4:
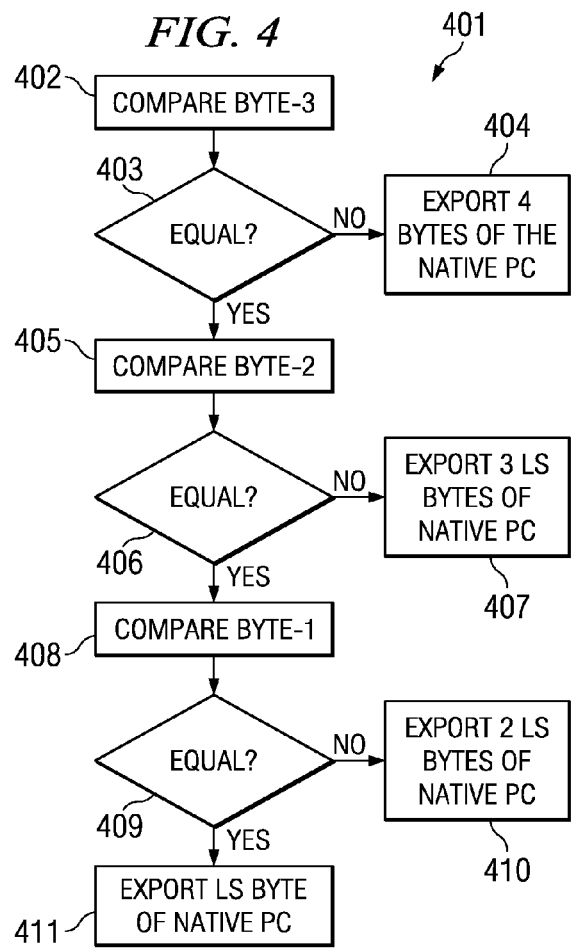
FIG. 4 illustrates a flow chart of the compare operation of the progressive extended compression mask of this invention.

FIG. 4 illustrates this process in flow chart form. Process 400 beings at start block 401. Process 400 first compares byte 3 of the program counter or data address with the 24-bit mask (processing block 402). If these bytes are not equal (No at decision block 403), then process 400 exports all four bytes (bytes 3 to 0, 32 bits) of the address (processing block 404). If these bytes are equal (Yes at decision block 403), then process 400 compares the byte 2 of the address with the mask (processing block 405). If these bytes are not equal (No at decision block 406), then process 400 exports the three least significant bytes (bytes 2 to 0, 24 bits) of the address (processing block 407). If these bytes are equal (Yes at decision block 406), then process 400 compares byte 1 of the address and the mask (processing block 408). If these bytes are not equal (No at decision block 409), then process 400 exports all the two least significant bytes (bytes 1 and 0, 16 bits) of the address (processing block 410). If these bytes are equal (Yes at decision block 409), then process 400 exports only the least significant byte (byte 0, 8 bits) of the address (processing block 411).

The progressive nature of this mask takes advantage if addresses are generated within a particular range of locations to reduce the number of bytes that need to be sent with each reference. An initial reference address or program counter value will have been sent containing all 4 bytes. If subsequent register branches or data references meet any text conditions of FIG. 4, this scheme will always send out less than the maximum number of bytes. Locality of data addresses and program code make this scheme more efficient in terms of preservation of bandwidth when dealing with profiling data addresses or program counter addresses with timing. New reference addresses are compared byte by byte with the prior valid reference address contained in the storage register.

A similar technique can be used for a programmable extended compression mask. Rather than compare the current data or program counter address with a prior address, the comparison is made with a predetermined address supplied by the central processing unit. This comparison address is preferably specified by a memory mapped data register. The programmable nature of this mask permits information known concerning the location of code and data to be used to help with the compression of these addresses. This scheme permits intelligent determination ahead of the trace collection session of which data and code locations are likely to be referenced in the execution of the application or segment of code within it. Plural memory mapped comparison registers can be used to deal with more section descriptions for data and code. This can deal with a wider range of data addresses and code. In the case of plural compare registers, an index associated with the compare register hit by the compare is provided along with the offset address when exporting the trace data packets.

Figure 5:
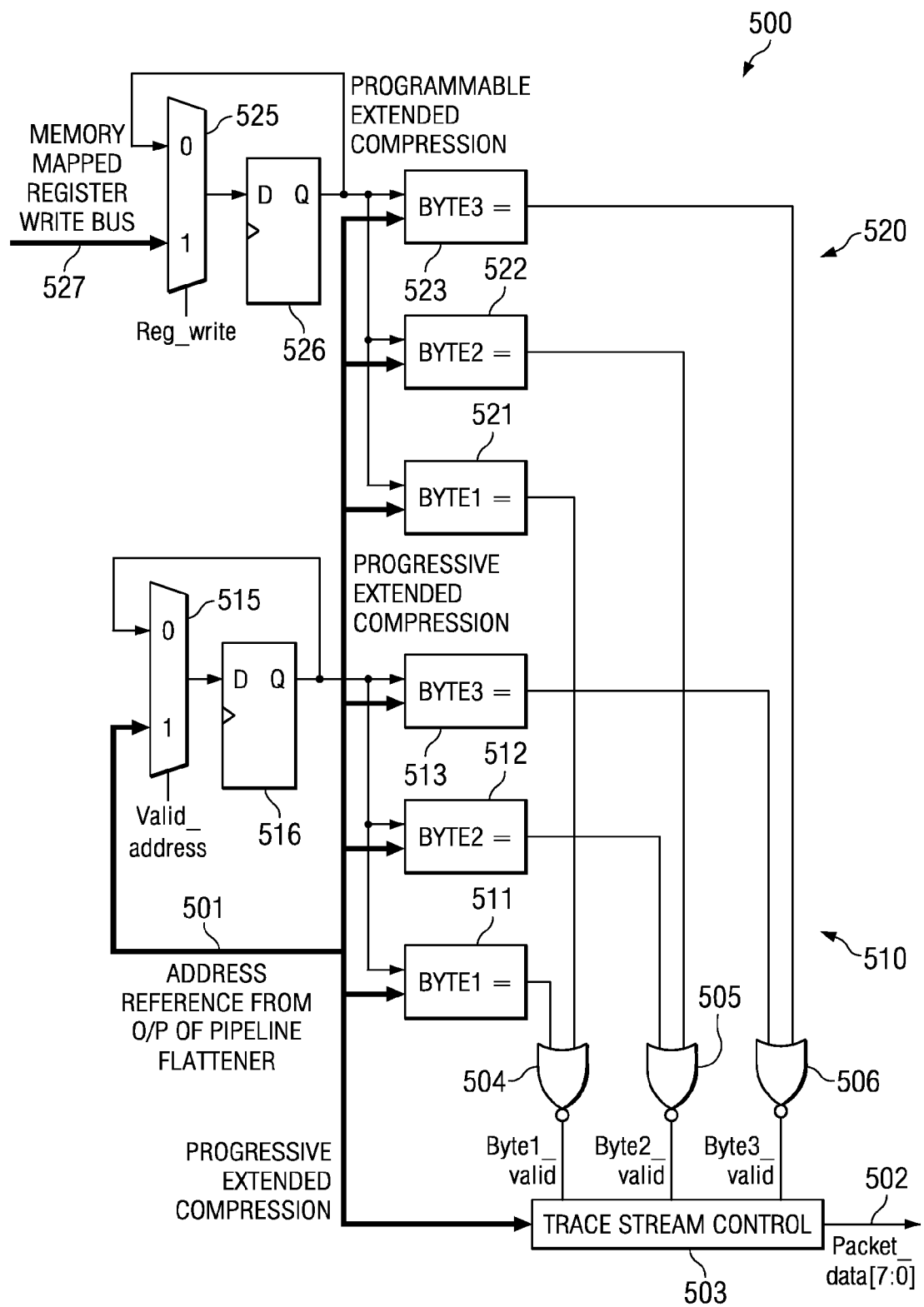
FIG. 5 illustrates in block diagram form a circuit including both the progressive and the programmable compression masks.

FIG. 5 illustrates a combined progressive and programmable compression schemes for tracing addresses as part of a dynamic trace stream. The trace address is received via address input 501. Trace stream control circuit 503 supplies 8-bit encoded trace packets via output 502. Trace stream control circuit 503 receives the trace address, and a Byte1_valid signal from NOR gate 504, a Byte2_valid signal from NOR gate 505 and a Byte#_valid signal from NOR gate 505. NOR gates 504 to 506 are driven by comparison sections 510 and 520.

FIG. 5 illustrates progressive trace compare section 510. Byte 1 of the trace address at input 501 supplies one input of Byte1 comparator 511. Byte 2 of the trace address at input 501 supplies one input of byte2 comparator 512. Byte 3 of the trace address at input 501 supplies one input to comparator 513. Comparators 511, 512 and 513 receive corresponding bytes from comparison register 516. Each comparator 511, 512 and 513 compares the 8 bits of their corresponding byte of the trace address received from input 501 and the compare address stored in comparison register 516. The respective comparison outputs of comparator 511, 512 and 513 are supplied to one input of NOR gates 504, 504 and 506.

Initially comparison address register 516 is empty, i.e. all 0's. Upon initialization, the first trace address is stored in comparison address register 516 via multiplexer 515. The second trace address is compared with the first comparison address now stored in comparison address register 516. A match at comparator 513 will cause trace stream control 503 not to output byte 3. A match at comparators 513 and 512 will cause trace stream control 503 not to output bytes 3 and 2. A match at comparators 513, 512 and 511 will cause trace stream control 503 to output byte 0 only. Table 1 shows the output function of trace stream control circuit 503.

TABLE 1

| Byte 1 | Byte 2 | Byte 3 | Output Bytes |
|---|---|---|---|
| — | — | Not Match | 3210 |
| — | — | Match | -210 |
| — | Match | Match | --10 |
| Match | Match | Match | ---0 |

Note that "-" is a don't care entry. For example, if comparator 512 or 511 detects a match but comparator 513 does not, then all four bytes are output.

The address stored in comparison address register 516 recirculates via the "0" input of multiplexer 515 until changed. This would typically take place when all three comparator 511, 512 and 513 fail to detect a match. If all the byte comparisons miss, then the trace address has probably moved to a different address region. It is best to reset the comparison address to this new address region and make future comparisons with the reset compare address. A "1" valid_address signal causes multiplexer 515 to select the trace address received on trace address input 501. Comparison register 516 stores this address selected by multiplexer 515. The valid-address signal would normally be "1" for a single cycle. Thereafter comparisons are made with the newly stored trace address.

FIG. 5 illustrates programmable trace compare section 520, which is similar to progressive trace compare section 510. Byte 1 of the trace address at input 501 supplies one input of Byte1 comparator 521. Byte 2 of the trace address at input 501 supplies one input of byte2 comparator 522. Byte 3 of the trace address at input 501 supplies one input to comparator 523. Comparators 521, 522 and 523 receive corresponding bytes from comparison register 526. Each comparator 521, 522 and 523 compares the 8 bits of their corresponding byte of the trace address received from input 501 and the compare address stored in register 526. The respective comparison outputs of comparator 521, 522 and 523 are supplied to one input of NOR gates 504, 504 and 506.

The compare address stored in compare address register 526 ordinarily recirculates via the "0" input of multiplexer 525. The central processing unit can change this comparison address by writing to the memory-mapped register. Upon a write to the memory-mapped register corresponding to comparison address register 526, the address appears on write bus 527 and the Reg_write signal is a "1". Multiplexer 525 selects the address on write bus 527 for storage in comparison address register 526. The Reg_write signal would ordinarily be "1" for only a single cycle or the minimum time for the write to complete. Thereafter, comparisons are made with the central processing unit supplied address now stored in comparison address register 526.

If there is more than one comparison unit, such a comparison units 510 and 520 illustrated in FIG. 5, trace stream control circuit 503 requires some manner (not illustrated) to identify the operative comparison unit. Trace stream compare circuit 503 places a comparison unit identity marker in the output trace stream 502. The receive unit then has a means of following the compressed trace stream. A new comparison address would be stored in comparison address register 516 only following transmission of the entire address to the receive unit. Control of the central processing unit program enables the receive unit a priori knowledge of the central processing unit specified address stored in comparison address register 526. Knowledge of which comparison unit is used would enable reconstruction of the trace address.

There are further complications if there are more than one progressive comparison unit 510 or more than one programmable comparison unit 520. Plural programmable comparison units 520 cause the least problems. The user presumably has control of or at least knowledge of the central processing unit specified trace addresses. Matching that knowledge to the comparison unit identity marker is feasible.

Plural progressive comparison units 510 are more problematic. Some technique is needed in order to keep track of the data stored within each comparison address register 516. This could done by trace stream control circuit 503 explicitly indicating in the trace stream when a comparison address register 516 is loaded and the identity of that register. Alternatively, it could be assumed that the least recently used comparison address register is replaced whenever an full 32-bit trace address is transmitted. Keeping track of the contents of plural comparison address registers may enable greater trace stream density by permitting two or more address regions to be compared.

This application describes a technique making comparisons by corresponding address bytes. Those skilled in the art would recognize that this represents merely a convenient design choice. The comparisons could be made by nibbles (4 bits), words (16 bits) or any other convenient data length including individual bits. The comparison length selected is preferably an integral fraction of the length of the addresses compared and in equal lengths throughout the addresses. Employing shorter comparison lengths increases the possibility of enabling data compression at the expense of additional control processes. Longer comparison lengths require less control processes but reduce the potential available data compression.

What is claimed is:

1. A trace compression apparatus comprising:
an input receiving a current trace address;
a comparison address register storing a central processing unit specified comparison address;
a plurality of section comparators, each section comparator connected to said comparison address register receiving a section of said comparison address and connected to said input receiving a corresponding section of said current trace address, each section comparator indicating a match or a not match of said corresponding sections; and
a trace stream control connected to said input and each of said section comparators, said trace stream control transmitting only least significant sections of the current trace address that do not match respective sections of the comparison address or are less significant than a section of the current trace address that does not match the comparison address.

2. The trace compression apparatus of claim 1, wherein:
said trace stream control always transmits a least significant section of said current trace address.

3. The trace compression apparatus of claim 1, further comprising:
a multiplexer having a first input receiving an output of said comparison address register, a second input receiving memory mapped write data, an output connected to an input of said comparison register, and a control input, said multiplexer coupling one of said first input or said second input to said output dependent upon a signal at said control input; and
said control input of said multiplexer receiving a memory mapped write indication causing said multiplexer to select said second input thereby storing said memory mapped write data in said comparison register upon a memory mapped register write to an address corresponding to said comparison address register.

4. The trace address compression apparatus of claim 1, wherein:
said section is an integral fraction of the length of the comparison address and the current trace address.

5. The trace address compression apparatus of claim 1, wherein:
said section has a length equal to 8 bits.

6. The trace address compression apparatus of claim 1, wherein:
said section has a length equal to 4 bits.

7. The trace address compression apparatus of claim 1, wherein:
said section has a length equal to 16 bits.

8. The trace address compression apparatus of claim 1, wherein:
said comparison address and said current address have length of 32 bits;
said plurality of section comparators consists of three byte comparators comparing respective three most significant bytes of said comparison address and said current trace address; and
said trace stream control operates to
transmit four bytes of said current trace address if a most significant byte comparator does not detect a match,
transmit three least significant bytes of said current trace address if a most significant byte comparator detects a match and a second most significant byte comparator does not detect a match,
transmit two least significant bytes of said current trace address if a most significant byte comparator and a second most significant byte comparator each detect a match and a third most significant byte comparator does not detect a match, and
transmit a least significant byte of said current trace address if a most significant byte comparator, a second most significant byte comparator and a third most significant byte comparator each detect a match.

9. The trace address compression apparatus of claim 8, wherein:
said trace stream control is further operative to transmit an indication of the selected comparison address or second comparison address with each transmission of an indication of the current trace address.

10. The trace address compression apparatus of claim 8, wherein:
said trace stream control is further operative to transmit an indication of the selected comparison address or second comparison address only upon change of said selection.

11. The trace address compression apparatus of claim 1, further comprising:
a second comparison address register storing a central processing unit specified second comparison address;
a plurality of second section comparators, each second section comparator connected to said second comparison address register receiving a section of said second comparison address and connected to said input receiving a corresponding section of said current trace address, each second section comparator indicating a match or a not match of said corresponding sections; and
trace stream control connected to said input and each of said section comparators, said trace stream control operative to
select one of either said comparison address or said second comparison address,
transmit only least significant sections of the current trace address that do not match respective sections of the selected one of the comparison address and the second comparison address or are less significant than a section of the current trace address that does not match the selected one of the comparison address or the second comparison address, and
transmit an indication of the selected comparison address or second comparison address.

12. The trace address compression apparatus of claim 11, further comprising:
a second multiplexer having a first input receiving an output of said second comparison address register, a second input receiving memory mapped write data, an output connected to an input of said second comparison register, and a control input, said multiplexer coupling one of said first input or said second input to said output dependent upon a signal at said control input; and
said control input of said second multiplexer receiving a memory mapped write indication causing said second multiplexer to select said second input thereby storing said memory mapped write data in said comparison register upon a memory mapped register write to an address corresponding to said second comparison address register.

* * * * *